Aug. 18, 1959    C. E. CUSHMAN ET AL    2,899,836
PUSH-PULL CABLE APPARATUS
Filed Feb. 16, 1955
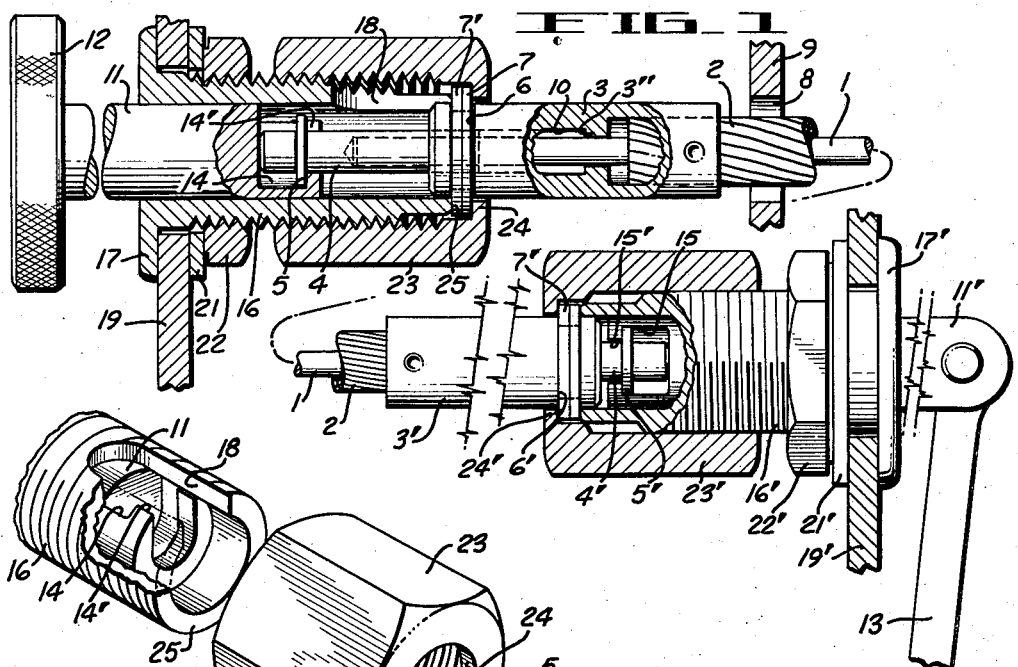
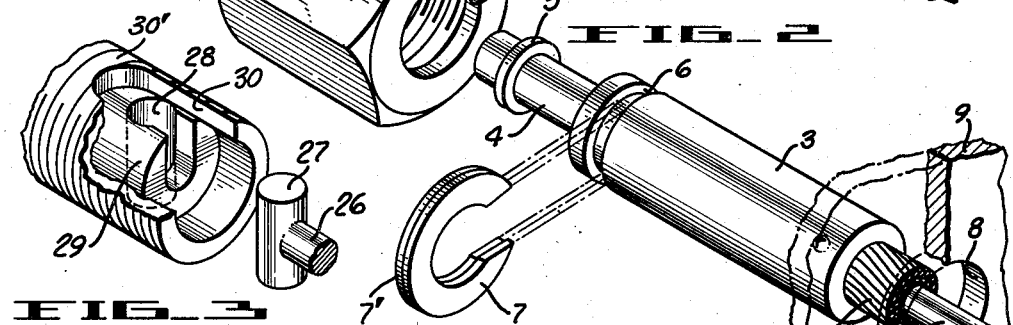
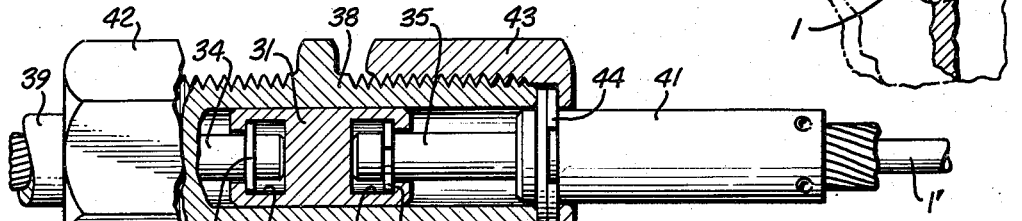
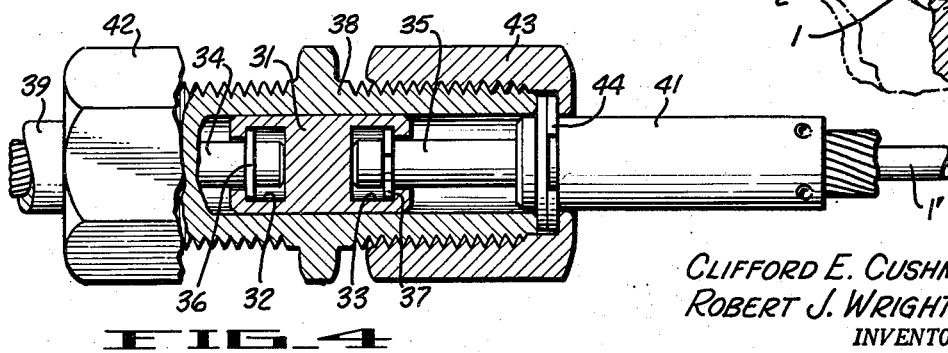
CLIFFORD E. CUSHMAN &
ROBERT J. WRIGHTON
INVENTORS
BY
Paul B. Hunter
ATTORNEY United States Patent Office 2,899,836
Patented Aug. 18, 1959

2,899,836

PUSH-PULL CABLE APPARATUS

Clifford E. Cushman, Burbank, and Robert J. Wrighton, Tarzana, Calif., assignors, by mesne assignments, to Pacific Scientific Aeroproducts, Glendale, Calif., a corporation of California Application February 16, 1955, Serial No. 488,564

6 Claims. (Cl. 74—502)

This invention relates in general to push-pull cables and more particularly to a novel push-pull cable apparatus which is reversible end for end, passes through relatively small openings in obstructions to facilitate easy installation and may be rapidly coupled and uncoupled to the controlling and controlled apparatus.

In transmitting mechanical motion from an accessible point to a remote or inaccessible point, push-pull cables or wires are widely utilized; for example, they are in common use in automobiles and aircraft for many mechanical controls. Such push-pull cables ideally should be light but strong and flexible, easy to thread through small or narrow openings in walls or obstructions existing between the control and controlled points, reversible so that no special care need be taken to see that the cable is threaded in one proper direction, and capable of being rapidly coupled and decoupled to the mechanisms at either end.

It is, therefore, the object of the present invention to provide a novel push-pull cable which incorporates all of the advantages cited above of reversibility, threading through small openings, rapid coupling, etc.

One feature of the present invention is the provision of a push-pull cable having identical end terminals, the cable having a sheath or casing and being adapted to couple to control elements at either end, the control elements having associated sleeve members adapted to fixedly couple to the cable sheathing.

Another feature of the present invention is the provision of a push-pull cable coupling apparatus wherein the flexible cable and its associated sheathing are fixedly secured to control elements at both ends with the provision, however, that the cable and sheath are freely rotatable.

Another feature of the present invention is the provision of a push-pull cable apparatus in which the relatively bulky coupling or locking device may be removed until after the cable has been threaded or passed through the openings in obstructions between the control and controlled points, after which the locking device may be coupled to the cable ends for mounting.

Still another feature of the present invention is the provision of a novel cable coupling apparatus, for rapidly and securely coupling together the ends of two push-pull cables.

These and other features and advantages of the present invention will be apparent from a perusal of the following specification taken in connection with the accompanying drawings wherein:

Fig. 1 is a fragmentary view partly in longitudinal section of one preferred embodiment of this invention showing both ends of the push-pull cable apparatus, the cable being broken and off-set to permit an enlarged view of the device;

Fig. 2 is an exploded view of a portion of the push-pull cable apparatus at one end;

Fig. 3 is a partly fragmentary perspective view of another type of cable termination; and Fig. 4 is a partly sectional view of a coupling device for coupling together the ends of two lengths of push-pull cable.

Referring now to Figs. 1 and 2, there is shown an embodiment of the present invention which comprises a strong but light and flexible cable or wire 1 which is enveloped by a sheath or casing 2 which is also strong but flexible, the cable 1 fitting loosely within the protective sheath. The cable 1 and sheath 2 may be made to any suitable length. Each end of the casing 2 is firmly and permanently secured as by swaging or prick-punching within a bore in one end of associated cylindrical-shaped terminal sleeve members or collars 3 and 3' that are but slightly larger in diameter than said sheath. Since this push-pull cable and associated coupling apparatus is substantially identical at both ends, the similar elements on the two ends shall bear a reference numeral on one end and the same numeral primed on the other end.

The ends of the cable 1 extend into and are firmly secured within axial bores in cylindrical ferrules or rods 4 and 4'. The ferrules 4 and 4' slide in cylindrical bores 10 in the terminal members or collars 3 and 3', a small inwardly directed annular ridge 3" being located in the bore 10 to limit the movement of the ferrules 4 and 4' and associated cable 1 longitudinally within the sheath 2 and terminal members or collars 3 and 3' to a desired distance, for example one-half inch.

Small split washers or coupling members 5 and 5' are mounted in grooves in the ferrules 4 and 4' near the free ends of these ferrules. These washers 5 and 5' may be rigidly secured on the ferrules or they may be mounted so as to allow rotation in the grooves. Annular grooves 6 and 6' encircle the collars or terminal members 3 and 3', respectively, near their outer ends, these grooves each being adapted to accommodate a pair of C-shaped washers 7 and 7' which easily slip transversely into and out of the grooves 6 and 6' (Fig. 2).

The cable assembly consisting of cable 1, sheath 2 and attached collars 3 and 3' is of relatively small overall outer diameter, thus enabling this cable assembly to be conveniently passed through equally small openings in obstructions existing between the control end and the controlled end such as hole 8 in wall 9 during installation. Because of this small cross-sectional size, this novel cable assembly will thread or pass through openings which would need enlarging when utilizing other known push-pull cables.

The control end of this push-pull device (the left-hand end in Fig. 1) comprises a control element or rod 11, the outer end of which is illustrated as secured to a knurled control knob 12, while the other or controlled end comprises a control rod 11' which terminates in the mechanism to be controlled or actuated, in the present instance a pivoted lever arm 13. The inner ends of the control rods 11 and 11' have two-section U-shaped recesses cut therein; rod 11 having stepped U-shaped recesses 14 and 14' cut therein and rod 11' having stepped U-shaped recesses 15 and 15' cut therein, the outer recesses 14' and 15' being smaller than recesses 14 and 15 to form a step or stop shoulder for engaging washers 5 and 5' as will further appear. The control rods 11 and 11' extend through axial bores in sleeve members 16 and 16', members 16 and 16' having flanges 17 and 17' on their outer ends, the outer surface of the sleeves being threaded. Slots such as 18 are cut into the inner end portions of the sleeve members 16 and 16', respectively. The sleeves 16 and 16' are shown securely mounted within openings in associated mounting plates 19 and 19', such as dash boards and the like, by lock washers 21 and 21' and nuts 22 and 22'.

In utilizing this push-pull device, the cable 1, sheath 2, fixed collars 3 and 3', ferrules 4 and 4' and washers 5 and 5', which are all permanently assembled into a unitary structure of small relative diameter, are threaded or passed through the various obstructions between the controlling and controlled points through openings which need be no larger than necessary to accommodate the limited diameter of terminal collars 3 and 3'. After the cable has been properly threaded through the various obstructions, nuts 23 and 23' are slipped over the ends of ferrules 4 and 4' and over terminal collars 3 and 3'.

A C-washer or washers 7 is then passed into the recess 6 at one end of the cable collar. The nut 23 which has previously been slipped over the collar 3 onto the sheath 2 may then be moved toward the end of the cable so that it passes over the C-washer or washers 7 to prevent the same from slipping off the collar 3. The washer or washers 7 in turn will engage an inwardly directed flange portion 24 on the nut 23 to prevent the nut from passing over the end of the terminal sleeve 3. The cable collar 4 and associated ring 5 may then be slipped into the U-shaped recesses 14 and 14' by transverse movement through the slot 18 in the sleeve member 16, the collar 4 and ring 5 being positioned within the recesses as shown in Fig. 1. It should be noted that the control rod 11 is shown in its extreme left-most position in Fig. 1 and that in coupling the collar 4 to the control member 11, the member 11 must be moved to the right to the position as shown in Fig. 2. The nut 23 is then slipped over and threaded on to the sleeve 16, covering the slot 18, the nut 23 being screwed up tightly until the flange 24 on the nut 23 secures the washer or washers 7 against the end 25 of the sleeve 16. In one particular apparatus made in accordance with the above-described invention, the nut was securely drawn up by hand using the thumb and forefinger. The opposite end of the cable is coupled to controlled member 11' and secured to sleeve 16' by use of the nut 23' and washers 7' in the same manner as described above for the left-hand end. Since the washers 7 and 7' are slightly loose in the grooves 6 and 6' in terminal members 3 and 3', the cable 1, sheath 2, terminal sleeve members 3 and 3' and link members 4 and 4' may be rotated freely although securely affixed at both ends against longitudinal movement other than the specific control movement permitted the cable 1 and link members 4 and 4'. Since the link ends of the cable 1 are identical, it is obvious that the cable may be coupled in a reverse manner to that shown in Figs. 1 and 2.

Referring to Fig. 3, there is shown another type of cable termination which may be utilized in place of the rings or washers 5 and 5'. In this instance, the ferrule 26 terminates in a small solid transverse cylinder or coupling member 27 which is adapted to slip into a cylindrical-shaped recess 28 in the control member 29 through the slot 30 in the sleeve 30'. In this case, the control cable and associated ferrules 26 may also be rotated as well as moved longitudinally if the control and controlled members 29 can rotate with respect to their associated sleeves 30' (only one of which is shown in the drawings).

There is shown in Fig. 4 a coupling assembly which is useful in coupling together two separate lengths of push-pull control cable. The common coupling element 31 is cylindrical in shape and has identical U-shaped stepped recesses 32 and 33 similar to recesses 14 and 15 located in each end, this coupling element 31 being slidably mounted within the bore in the double-ended sleeve member 38. The ferrules 34 and 35 and associated washers 36 and 37 are fitted within the recesses 32 and 33 after slipping through slots in the ends of the sleeve 38 similar to slots 18 in Figs. 1 and 2. The slots are not seen in Fig. 4 since they are both located in that portion of the sleeve which has been sectioned away. The collars 39 and 41 of the respective cable assemblies are secured to the sleeve member 38 by the nuts 42 and 43, respectively, similar to nuts 23 and 23', and are in association with their related washers such as 44. Actuation of rod 1' moves coupling element 31 longitudinally within the bore of sleeve member 38 in use to actuate the connected rod.

Since many changes and modifications may be made in the described apparatus without departing from the scope of the invention, the foregoing description and accompanying drawings are to be considered as exemplary and not in a limiting sense.

What is claimed is:

1. A push-pull control device comprising a flexible cable, a flexible sheath enveloping said cable, a terminal collar slightly larger in diameter than said sheath secured to the end of said sheath and having an annular slot therein, said cable, its sheath and attached collar being capable, when installed, of passing through bulkhead openings but slightly larger than said terminal collar, thereby facilitating the installation thereof, a removable C-shaped washer for engaging in said slot, a ferrule secured to the end of said cable, a sleeve member, a control member surrounded over part of its length by, and slidable within, said sleeve member, said control member having a transverse opening therein, a lock nut for engaging said C-shaped washer and adapted to be threaded upon said sleeve member for detachably coupling said sheath terminal collar to said sleeve member, and means provided on said ferrule and projecting into said control member opening for detachably coupling the control member to said ferrule, whereby the cable can be moved longitudinally relatively to its sheath in response to sliding movement of the control member in the sleeve member.

2. A push-pull control device comprising a flexible cable, a flexible sheath enveloping the cable, a terminal collar of somewhat larger diameter than said sheath secured to the end of said sheath and having an exterior slot therein, an actuating ferrule secured to the end of said cable, a control element arranged to engage said ferrule for coupling thereto, a threaded sleeve member for supporting said control element, a nut arranged to be threaded onto said sleeve member, and a C-shaped washer transversely slidable into the slot of said collar and adapted to be engaged by said nut to draw said collar and said sleeve member securely together to retain said ferrule and said control element in coupled relation, said flexible cable, its sheath and attached collar being adapted to pass through relatively small openings slightly larger than said collar and smaller than said nut during the installation of said push-pull device, thereby facilitating such installation.

3. A push-pull control device as claimed in claim 2 wherein said control element is provided with a stepped U-shaped transverse recess and said ferrule is provided with a projection for engaging in said recess through transverse movement of the ferrule with respect to said control member, thereby to attach the control member to the ferrule, said sleeve member being recessed to accommodate the transverse movement of said ferrule.

4. A control cable apparatus comprising a cable, a sheath enveloping said cable and having a collar fixed on the end thereof, said collar being but slightly larger than said sheath to enable the same to be passed through relatively small bulkhead openings while installing said cable apparatus, a ferrule secured to the end of said cable and surrounded by said collar, a control member, a bearing support for said control member, said ferrule projecting from said collar for engaging said control member, said ferrule having a transverse projection and said control member having a conforming recess for receiving said projection, whereby movement of said control member acting through said ferrule projection serves to cause similar movement of said cable in use.

5. Control cable apparatus as defined in claim 4 wherein said collar is provided with a removable radial projection, a nut slidable over said collar for threading upon said bearing support to retain said ferrule projection and said control member in assembled relation, said collar projection being removed during the installation of said cable to enable the same to be passed through bulkhead openings substantially the size of said collar but being applied to the collar after the passage of said nut thereover during assembly with the control member, whereby the nut engaging said collar projection and threaded upon said sleeve member serves to retain the sheathed cable in cooperative relation with the control member.

6. Control cable apparatus as defined in claim 5 comprising a second ferrule affixed to the other end of said cable for cooperation with a second control element, a second bearing support supporting said second control element, a second collar on the other end of said sheath, and means for coupling said second collar to said second bearing support.

References Cited in the file of this patent

UNITED STATES PATENTS

| | | |
|---|---|---|
| Re. 13,884 | Herzmark | Feb. 23, 1915 |
| 421,587 | Ksell | Feb. 18, 1890 |
| 828,815 | Edwards | Aug. 14, 1906 |
| 1,297,327 | Dakin | Mar. 18, 1919 |
| 1,339,811 | Dobrick | May 11, 1920 |
| 1,575,826 | Goetz | Mar. 9, 1926 |
| 1,753,297 | McKee | Apr. 8, 1930 |
| 2,034,335 | Fisher | Mar. 17, 1936 |
| 2,048,398 | Lasker | July 21, 1936 |
| 2,483,779 | Mucher | Oct. 4, 1949 |
| 2,543,510 | Sandberg | Feb. 27, 1951 |
| 2,553,025 | Weber et al. | May 15, 1951 |
| 2,744,777 | Mucher | May 8, 1956 |

FOREIGN PATENTS

| | | |
|---|---|---|
| 411,525 | Great Britain | June 11, 1934 |
| 556,182 | France | July 13, 1923 |
| 687,295 | France | Apr. 28, 1930 |

OTHER REFERENCES

Kupfrian Mfg. Co. Bulletin No. 5194, page 8, Apr. 11, 1952.